(12) United States Patent
Anjum et al.

(10) Patent No.: US 9,398,566 B2
(45) Date of Patent: Jul. 19, 2016

(54) INTER-OPERATOR RADIO RESOURCE SHARING IN DENSE DEPLOYMENTS OF SMALL CELL NETWORKS

(71) Applicant: Nokia Corporation, Espoo (FI)

(72) Inventors: Omer Anjum, Espoo (FI); Mikko Uusitalo, Helsinki (FI); Jari Petteri Lunden, Espoo (FI); Carl Wijting, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/490,588

(22) Filed: Sep. 18, 2014

(65) Prior Publication Data

US 2016/0088590 A1   Mar. 24, 2016

(51) Int. Cl.
*H04W 40/00* (2009.01)
*H04W 72/04* (2009.01)

(52) U.S. Cl.
CPC ..................................... *H04W 72/04* (2013.01)

(58) Field of Classification Search
CPC . H04W 24/10; H04W 72/0453; H04W 28/16; H04W 36/0088; H04B 7/155
USPC .................................................. 455/446, 450
See application file for complete search history.

(56) References Cited

U.S. PATENT DOCUMENTS

| 7,894,821 | B2 | 2/2011 | Bai et al. | |
| 9,049,550 | B2* | 6/2015 | Wigren | G01S 5/0009 |
| 2010/0248728 | A1 | 9/2010 | Sun et al. | |
| 2012/0039216 | A1* | 2/2012 | Li | H04L 5/0032 |
| | | | | 370/254 |
| 2013/0308481 | A1* | 11/2013 | Kazmi | H04W 24/02 |
| | | | | 370/252 |
| 2014/0073338 | A1* | 3/2014 | Lioulis | H04W 72/0446 |
| | | | | 455/452.1 |
| 2015/0296467 | A1* | 10/2015 | Kim | H04W 56/00 |
| | | | | 370/330 |

OTHER PUBLICATIONS

Hanaoka et al., "Platform for Load Balancing and Throughput Enhancement with Cognitive Radio," IEICE Transactions on Communications E91-B(8):2501-2508 (2008).

* cited by examiner

*Primary Examiner* — Don N Vo
(74) *Attorney, Agent, or Firm* — Mintz Levin Cohn Ferris Glovsky and Popeo, P.C.

(57) ABSTRACT

Methods and apparatus, including computer program products, are provided resource sharing. In some example embodiments, there may be provided a method, which may include receiving information including location information for at least one cell of a primary resource group, and further including a primary resource being used by the at least one cell; and determining at least one secondary resource group based on the received information. Related apparatus, systems, methods, and articles are also described.

15 Claims, 5 Drawing Sheets

MNO A → MNO B

202 Request the cluster IDs tagged with geographical limits

204 Send its cluster IDs tagged with their geographical limits

206 Request the coordinates of each cell in a cluster with certain ID and the part of spectrum each cell uses 208 Send back the requested information 210 Request the possible secondary grouping for each cell 212 Acknowledge the suggested grouping / with modification

MNO A | | MNO B
--- | --- | ---
| 202 | Request the cluster IDs tagged with geographical limits → |
| 204 | Send its cluster IDs tagged with their geographical limits ← |
| 284 | Request only the part of spectrum used by some far cluster with certain ID → |
| 286 | Send back the Information ← |
| 288 | Request the possible secondary grouping for a far cluster → |
| 290 | Acknowledge the suggested grouping with or without modification ← |

INTER-OPERATOR RADIO RESOURCE SHARING IN DENSE DEPLOYMENTS OF SMALL CELL NETWORKS

FIELD

The subject matter disclosed herein relates to wireless communications.

BACKGROUND

The use of heterogeneous networks (HetNets) may provide opportunities for offloading traffic from macrocells to a typically higher capacity small cell. The heterogeneous network may include one or more wireless access points, or base stations, such as for example an E-UTRAN (evolved Universal Mobile Telecommunications System Terrestrial Radio Access Network) NodeB base station serving macrocells and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have some of the functionality found in a typical base station, such as for example an E-UTRAN NodeB (eNB) base station, but the small cell base station may have less range and output power given its limited coverage area. For example, the small cell base station may be implemented as a wireless access point/fermtocell base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided resource sharing.

In some example embodiments, there may be provided a method, which may include receiving information including location information for at least one cell of a primary resource group, and further including a primary resource being used by the at least one cell; and determining at least one secondary resource group based on the received information.

In some variations, one or more of the features disclosed herein including the following features can optionally be included in any feasible combination. The at least one secondary resource group may include the at least one cell and another cell having an overlapping coverage area with the at least one cell. The at least one secondary resource group may include the at least one cell and another cell having non-overlapping coverage area with the at least one cell. The at least one cell and the other cell may share, as a secondary resource, the primary resource. The primary resource may include at least one of a frequency or a time. The other cell may be a member of another primary resource group. The primary resource group and the other primary resource group may have at least one of non-overlapping coverage areas or similar traffic characteristics. The at least one cell of the primary resource group may be in a first mobile network, and the other cell of the other primary resource group may be in a second mobile network. The first mobile network may signal the second mobile network to form the at least one secondary resource group by at least requesting the information including the location information and the primary resource. The first mobile network may be operated by a network operator different than the second mobile network. The cell and/or the other cell may each comprise a small cell.

Articles are also described that comprise a tangibly embodied computer-readable medium embodying instructions that, when performed, cause one or more machines (for example, computers) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Like labels are used to refer to same or similar items in the drawings.

DETAILED DESCRIPTION

Small cells, such as picocells, femtocells, and the like, are being deployed with increasing frequency. Moreover, small cells may be densely deployed, without much in the way of detailed network planning. In addition, some of the small cells may be portable or nomadic (and controlled by mobile network operators or local private operators). As such, network traffic distribution may change with the increasing deployment of small cells, which may also result in larger cell overlaps and more diverse and dynamic traffic distribution in ultra-dense small cell deployments, when compared to conventional macrocell deployments. In these small cell deployments, there may also be a scarcity of resource (given for example a relatively large frequency re-use factor among small cells) and/or substantial inter-cell interference (given for example co-channel small cell deployments).

In some example embodiments, each of the small cells in a cluster may form two kinds of resource groups, namely a primary resource reuse group and a secondary resource reuse group.

The primary resource reuse grouping may include one or more cells, such as small cells. Moreover, the cells may be grouped into primary resource reuse groups in order to share resources. In addition, cells in a given primary resource reuse group may be selected such that the cells do not overlap with respect to cell coverage area with cells in another primary resource reuse group. Furthermore, the primary resource reuse grouping may be grouped based on traffic characteristics of the cells. For example, one or more cells may be grouped into a first primary resource reuse grouping, and these cells may have similar traffic characteristics. Similarly, one or more other cells may be grouped into a second primary resource reuse grouping, and these other cells may have similar traffic characteristics. In this example, the cells in the first primary resource reuse group may share primary resources in the time and/or frequency domain (for example, such as a frequency band and/or a time slot), while the other cells in the second primary resource reuse group may share other resources in the time and/or frequency domain.

In some example embodiments, secondary resource reuse groups (RRG) may be formed based on an amount (or degree) of shared, overlapping cell coverage region among cells present in a same or a different small cell cluster. The cells in a given secondary resource group may be in the same or different primary resource group and/or may be in the same or different mobile network operator's network. When formed, a secondary resource reuse group of cells may share one or more allocated primary resources in the time domain and/or frequency domain, and these resources may optimize and/or maximize usage of allocated resources.

The secondary resource reuse grouping may include one or more cells, such as small cells. Moreover, cells grouped into a secondary resource reuse group may be grouped in order to share resources. However, the small cells in secondary resource reuse group may be formed among neighboring cells having a certain degree of shared coverage area (for example, an overlapping cell coverage region). To illustrate, in a given secondary reuse group of small cells, the small cells may share one or more primary resources (which were allocated via the primary resource reuse grouping). In this example, signaling may be required to share the resources among the secondary cells to ensure that a secondary resource (which is currently not being used for example by a first cell) is shared with another cell, while secondary resources that are currently in use are not shared. To illustrate further, signaling between nodes, networks, and/or networks of different mobile network operators may be used to group cells, such as small cells, in to primary and/or secondary resource reuse groups to enable sharing of allocated resources.

Furthermore, the given secondary resource reuse group of small cells may share secondary resources in a decentralized way with each other as well. For example, if the secondary reuse grouping includes cells that do not overlap with respect cell coverage area (referred to herein as "cell edge" users), the resources of the secondary reusing grouping cells may be shared without coordination with the cells. To illustrate further, when a first cell seeks to make a secondary group with another second cell, the network node may, based on the cells shared coverage, indicate to the cells to share the resources with or without coordination. The network entity may indicate without coordination if the cells are non-overlapping. When this is the case, there may not be a need for signaling other than the indication of for example, secondary sharing with or without coordination.

Alternatively or additionally, signaling may be utilized to enable the resource sharing in the cell edge case.

Referring to the previous example, one or more cells (which do not overlap with respect to cell coverage region) may be grouped into a first primary resource reuse group, and these cells may share a primary resource of frequency F1 and F2. Similarly, one or more other cells (which do not overlap with respect to cell coverage region) may be grouped into a second primary resource reuse grouping, and these other cells may be allocated a primary resource of frequency F3. In this example, a first cell in the first primary resource reuse group may have a relatively moderate overlap in cell coverage with second cell in second primary resource reuse group. When this is the case, the first cell and the second cell, although in different primary resource reuse groups, may be grouped into a secondary resource reuse group in order to share allocated primary resource, frequency F1. In this example, the second cell may have a primary resource of frequency F3 and a secondary resource of frequency F1. In this example, these neighboring cells, such as the first and second cells, may each share their primary resources via signaling and/or in a decentralized way as well.

Figure 1:
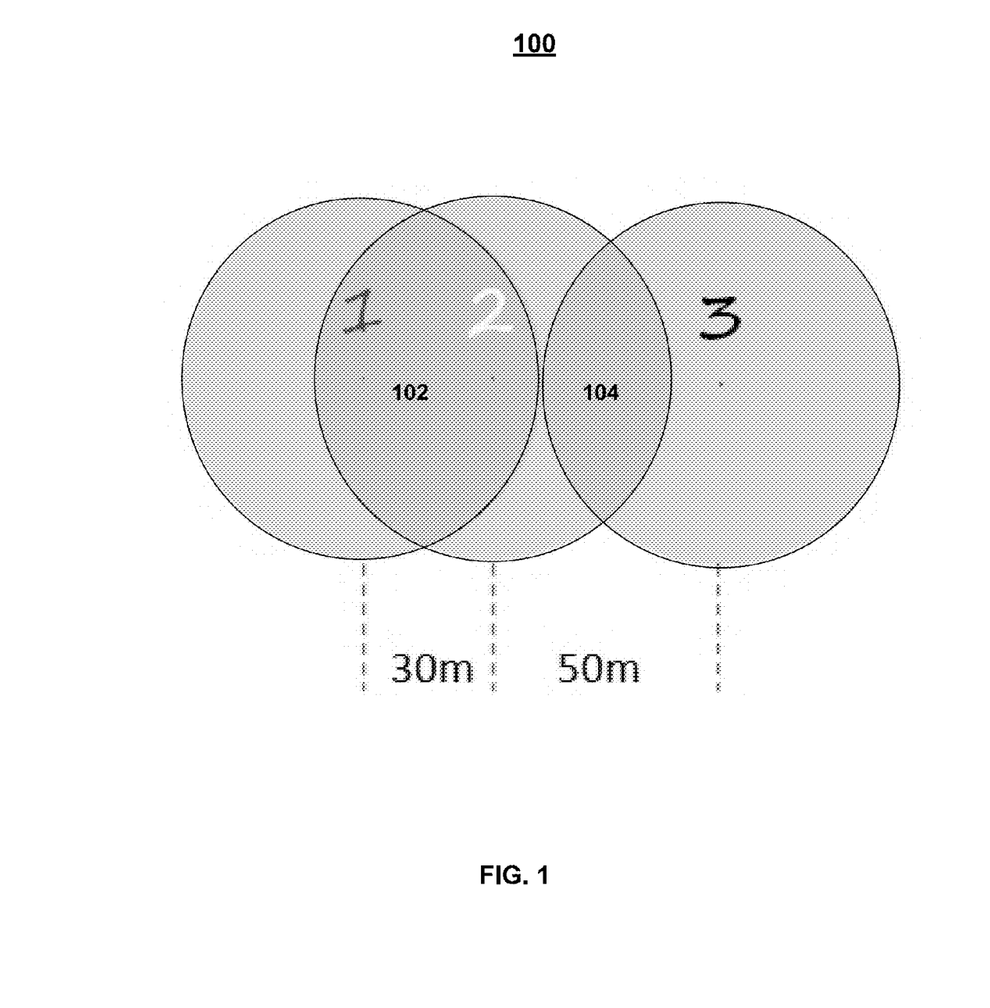
FIG. 1 depicts an example of a system including small cells, in accordance with some example embodiments.

FIG. 1 depicts an example system 100 including three cells (labeled 1-3), in accordance with some example embodiments. As noted, these three cells may be grouped into corresponding primary resource reuse groups. The primary resource reuse groups may be formed based on whether the cells overlap with respect to cell coverage region, whether the cells belong to the same mobile network operator's network, and/or whether there are similar traffic patterns among the cells.

In the example of FIG. 1, there may be for example 14 users in each cell with a per user throughput demand of for example 2 Mbps. The available resource spectrum consists of for example a 20 MHz band (for example, 100 resource blocks). In this example, a minimum number of primary resource reuse groups may be determined as 2 (A and B) as shown in Table 1 below.

TABLE 1

| Cell Id | Primary Resource | Secondary Resource |
|---------|------------------|--------------------|
| 1 | A | |
| 2 | B | |
| 3 | A | $B_2$ |

In the example of FIG. 1, cell 1 and cell 3 are assigned to the same primary resource reuse group, A. As a consequence, cells 1 and 3 may share the same primary resources in time and/or frequency. Moreover, this sharing may take place without any coordination, although signaling may be used as well. In the example of FIG. 1, cell 2 has a coverage region that overlaps 102 substantially or heavily with cell 1. As such, cell 2 may be assigned to another primary resource reuse group, B, as shown in Table 1.

Once the primary resource reuse grouping is made, the secondary resource reuse grouping may also be performed. In the example of FIG. 1, cell 3 and cell 2 may form a secondary resource reuse group because the overlap 104 between cell 2 and 3 is relatively moderate (for example, at most about ⅓ of the cell coverage areas overlap, although other values of overlap may be used as well). When there is moderate or little to no overlap with respect to cell coverage area, cell 3 may utilize some of the resources allocated to cell 2. For example, cell 3 may utilize the primary resources of A and the secondary resources of B by virtue of the secondary resource reuse grouping.

In some example embodiments, the primary and/or secondary resource reuse groups of small cells can be formed by a node, such as a base station and the like. Moreover, this node may also allocate primary and/or secondary resources according to the groupings. Alternatively or additionally, the primary and/or secondary resource reuse groups of small cells can be formed by a self-organizing network (SON) function, an O&M function, a controlling macro cell/base station, a master small cell/base station of a cluster of small cells that consists of group(s) of small cells, and/or any other node. Moreover, these nodes may allocate primary and/or secondary resources according to the groupings as well. In the case of coexistence under a localized service area (LSA), coordination may be provided by a common LSA controller. In the case of co-primary spectrum use, negotiation via a direct interface may be provided as well.

The previous example of FIG. 1 shows that a primary resource allocation can be performed by grouping non-overlapping cells 1 and 3 into a primary resource reuse group, although the primary grouping may take into account other factors as well including whether the cells have similar traffic characteristics and/or whether the cells belong to the same mobile network operator's network.

The previous example of FIG. 1 shows that if there are some free resources in a cell of the primary resource reuse grouping, those free resources may again be distributed among the cells based on the traffic load/characteristics. However, some cells may share a substantial coverage region with other cells, while some other cells may share coverage regions less so with their neighbors. For example, there may be some benefit in having a cell (which has moderate, little, or no shared coverage region with its neighbors) share a primary resource with a neighboring cell in for example another primary resource group. This shared resource may thus serve as a secondary resource for the neighboring cell.

Moreover, a cell (which is geographically farther away than for example a certain threshold distance) that uses non-overlapping resources may primarily be classified as a cell to be included in a secondary resource reuse group, and this classification may be performed, in some instances, without the need of any further knowledge or signaling.

However, a cell located closer than the certain threshold distance, may, in some example embodiments, be analyzed with respect to coverage area. For example, a cell may perform coverage analysis for another cell based on some propagation model and the location information. If exact map information is available, the analysis may be more accurate which may be further verified and fine-tuned with the assistance of measurement reporting information. To illustrate further, consider two cells A and B. Cells A and B may be geographically situated within line of sight coverage of each other, but cells A and B may still be non-interfering or not heavily overlapping with each other if there are sufficient barriers/insulations (for example, thick walls of a building and the like) between them absorbing for example the signals emanated by cells A and B. In this example, if cell A wants to make a secondary group with cell B situated geographically within line of sight coverage of cell A, cell A may apply a propagation model (for example, ray tracing and the like) on a map in the region of interest. The region of interest may take into account some, if not all, of the locations on the map which would be under shared coverage under certain line of sight condition with a certain transmit power. Cell A may perform this analysis alone, although the analysis may be performed at other nodes as well. The map and propagation models for this analysis may be stored locally at cell A (to avoid overhead messaging for example) or in the other network nodes, such as in the network core. For example, cell A may request a central or a core node to do the analysis by providing its own and cell B's location. The node (which performs the analysis) may then respond with whether the secondary grouping is possible or not. In addition, the analysis may be fine-tuned or validated by the test signals (for example, the node may compare the actual measured reference signal received power (RSRP) at a user equipment located in the region of interest to the one predicted by the model. If cell A performs the analysis locally, then cell A may perform this comparison as well. If another node performs the analysis, cell A send the reported RSRPs to the node performing the analysis.

Figure 2A:
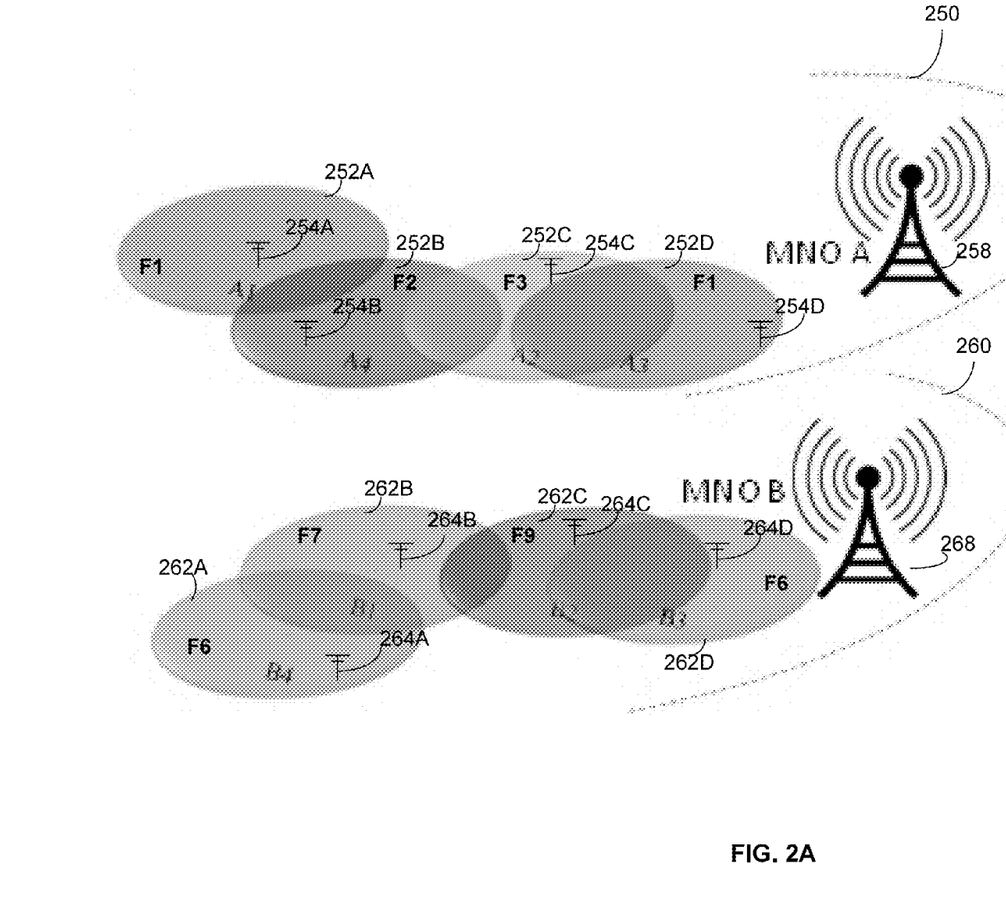
FIG. 2A depicts another example of a system including multiple mobile network operators and small cells, in accordance with some example embodiments.

FIG. 2A depicts two networks 250 and 260 belonging to for example different networks or operators, although the networks may belong to the same network or operator as well. In this example, network A 250 includes 3 primary resource reuse groups. Specifically, cells 252A and D (at frequency F1) represent a first primary grouping, cell 252B represents a second group (at frequency F2), and cell 252C represents a third group (at frequency F3). Network B 260 represents three other primary resource reuse groups. Specifically, cells 262A and D (at frequency F6) represent a first primary grouping, cell 262B represents a second group (at frequency F7), and cell 262B represents a third group (at frequency F9). Moreover, these primary resource reuse groupings may be formed based on similar traffic characteristics. For example, the primary grouping of cells 262A and D (at frequency F6) may be formed from cells having non-overlapping coverage areas that share similar traffic characteristics. Furthermore, a resource control node may allocate resources (for example, a frequency and/or time resource) to the cells in each of the formed primary resource reuse groups.

In the example of FIG. 2A, secondary groupings may be formed between some of the cells in the first network A 250 and some of the cells in the second network B 260, although the secondary groupings may be formed within a single network as well.

The network A 250 may include a wireless access point 258, such as a macro base station, and one or more overlapping small cells 252A-D (labeled A1-A4). And, each of the small cells may be served by a small cell wireless access point or small cell base station 254A-D. The second network B 260 may include a wireless access point 268, such as a macro base station, and one or more overlapping small cells 262A-D (labeled B1-B4). Moreover, each of the small cells may be served by a small cell wireless access point or small cell base station 264A-D.

Figure 2B:
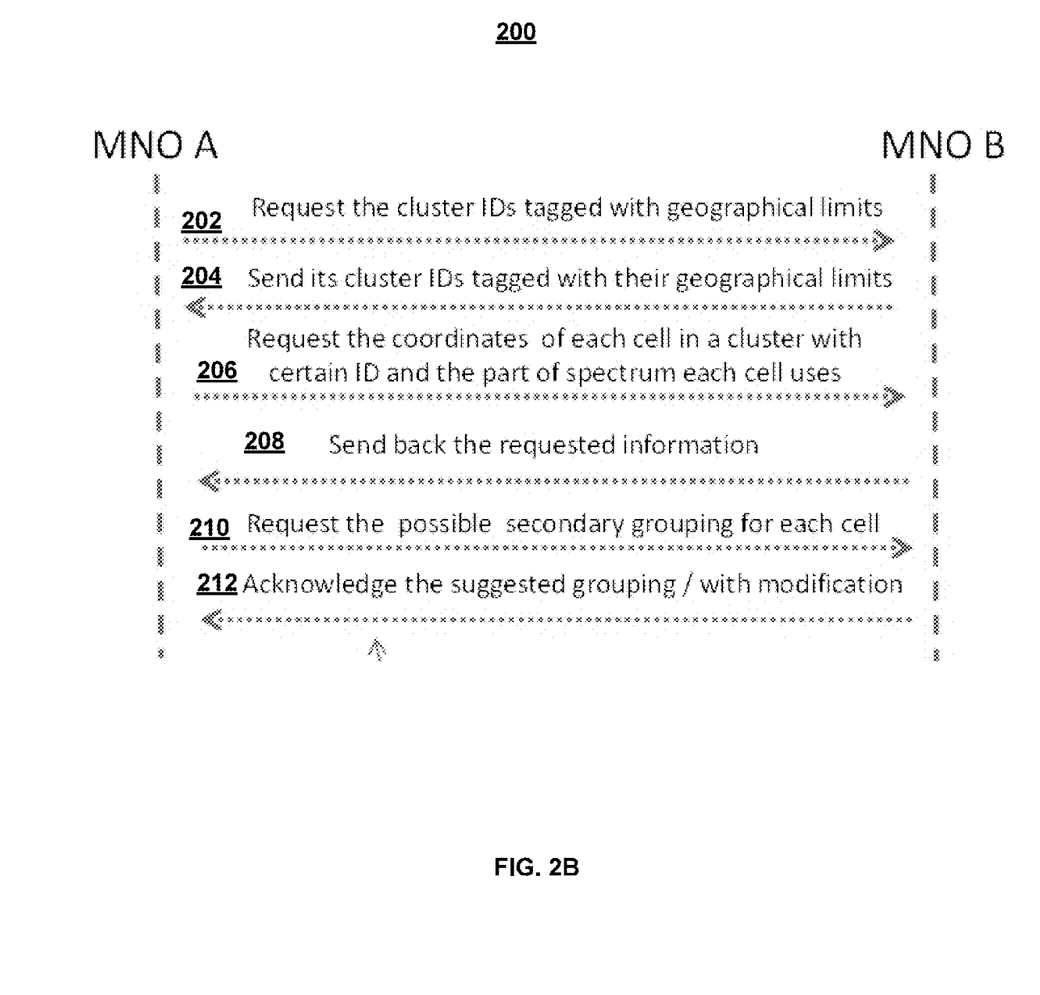
FIG. 2B depicts an example of a process for grouping small cells for resource allocation, in accordance with some example embodiments.

When mobile network operator (MNO)/network A 250 seeks to form a secondary resource reuse groups with one or more cells in the cluster 260 belonging to MNO/network B, the two networks 250 and 260 may exchange information (via signaling for example) as further described below with respect to FIGS. 2A/2B in order to form the secondary resource reuse groups. For example, clusters/networks 250 and 260 may exchange location information for the cells or wireless access points/base stations in each of the clusters to identify overlapping clusters of cells. This information may be used to determine/detect cells for secondary resource reuse grouping.

In the example of FIG. 2A, a network A (for example, base station 258 and/or any other node) may determine for each cell, such as cell 252A and the like, in cluster A 250, other candidate cells in network 260 information regarding one or more conditions in order to determine whether to form a secondary resource reuse grouping. For example, network A may identify other cells in network B that do not share cell coverage with cell A, other cells in network B having moderate shared cell coverage with cell A, and/or other cells in network B that use different resources (for example, not using the same portion of the frequency spectrum). Moreover, network A may determine whether a certain resource, to be used as a secondary resource, is not being utilized by another cell with a heavy/substantial cell. Moreover, if two cells in network A are heavily overlapped and have the option to form a secondary group with a certain cell in network cluster B, then the cell with less shared coverage with the cell in cluster B may be used to form the secondary group. Based on these conditions, cell A1 252A may for a secondary group with cells B2 262C, B3 264B, or B4 262B (without or without coordination). Similarly, cell A4 252B may form a secondary group with cells B2 262C, B3 262D, or B4 262A, although other secondary grouping may be formed as well.

Figure 2C:
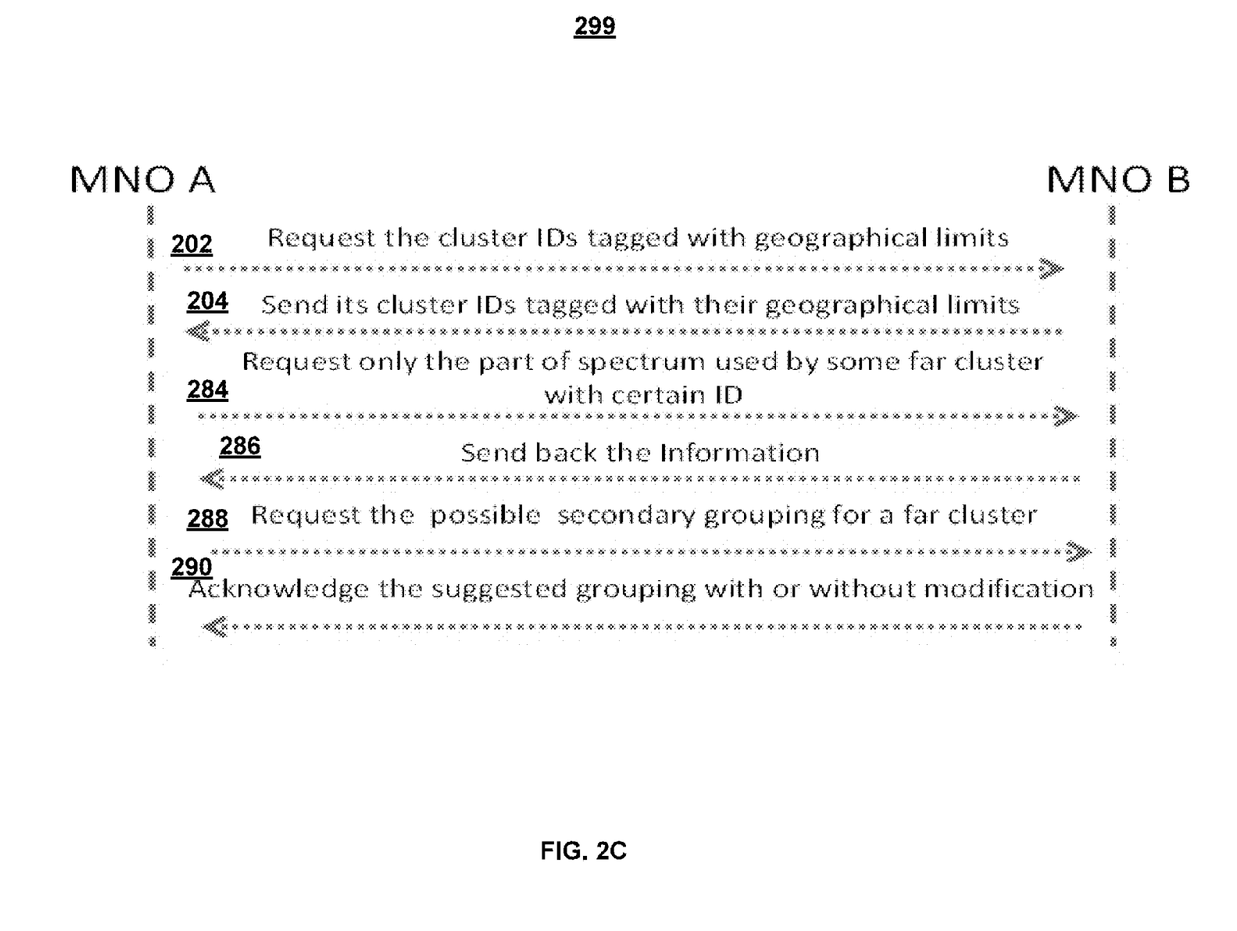
FIG. 2C depicts another example of a process for grouping small cells for resource allocation, in accordance with some example embodiments.

In some example embodiments, secondary resource reuse groups may be determined, as noted above, based overlapping (or shared) coverage region, although other conditions may be taken into account as noted above. Moreover, the determination of the overlapping coverage and candidate secondary groupings may be performed based on a signaling exchange of information among nodes, cells, and/or networks. An example of this signaling exchange is depicted at FIGS. 2B and 2C.

FIG. 2B depicts a signaling process 200 for identifying overlapping cells in order to form secondary resource reuse groups, in accordance with some example embodiments. The description of FIG. 2B also refers to FIG. 2A.

At 202, a request for cluster identifiers (IDs) may be sent by the first network to the second network, in accordance with some example embodiments. For example, a node in cluster 250, such as a base station, a wireless access point, and/or any other node, may send a request for cluster IDs including geographic information for the clusters.

In response to request 202, the second network may, at 204, send a cluster IDs with the geographic information to the second network, in accordance with some example embodiments. For example, a node in cluster 260 may send one or more cluster IDs including geographic information for the clusters. In the example of FIG. 2A, base station 268 may provide a cluster ID, such as cluster "B" which includes cells B1-B4, and a location (or area) of cluster B 260.

At 206, the first network may send a request for the location of each cell in a cluster, in accordance with some example embodiments. In the example of FIG. 2A, base station 258 may request the cell IDs and locations of each of the cells B1-B4 in cluster B 260.

At 208, the second network may respond with location information for each cell, in accordance with some example embodiments. In the example of FIG. 2A, base station 268 may provide a cell identifier (ID) for cells B1-B4 and the location of cells B1-B4.

At 210, the first network may request a possible secondary grouping for each cell, in accordance with some example embodiments. For example, a node, such as a base station/wireless access point in cluster A 260 and the like, may request a secondary grouping between a cell in cluster A 250 and a cell in cluster B 260. For example, the request may indicate that cell A2 252B requests a secondary resource reuse grouping with cell B1 262B. In this example, cell A2 252B may use as a secondary resource frequency F8 allocated to cell B2 262B and/or cell B2 262B may use as a secondary resource frequency F3 allocated to cell A2 252B.

The request 210 may be sent by a base station/wireless access point in a small cell requesting the secondary grouping. Alternatively or additionally, the request 210 may be sent by base station 258 on behalf of a small cell in cluster A 260, although any other node may make or send this request for a secondary resource as well.

At 212, the second network may acknowledge the request 212 by confirming the request for the secondary grouping and/or proposing a modification to the secondary grouping, in accordance with some example embodiments. For example, a node in cluster B 260 may respond by accepting the request to make cell A2 252B and cell B2 262B a secondary grouping or by modifying the request by for example proposing another grouping or cell for the secondary grouping.

FIG. 2C depicts a process 299 for forming secondary resource reuse groups when cells are geographically farther away, in accordance with some example embodiments. The description of FIG. 2B also refers to FIG. 2A.

At 202, a request for cluster IDs may be sent by the first network to the second network, and in response to request 202, the second network may, at 204, send a cluster IDs with the geographic information to the second network, in accordance with some example embodiments.

At 284, the first network may send a request for certain non-overlapping far cluster owned by MNO B. At 286, the second network may respond with the information about resources used in time and frequency domain in that far cluster.

At 288, the first network may request a possible secondary grouping of one or more cells in the far cluster, in accordance with some example embodiments. At 212, the second network may acknowledge the request 212 by confirming the request for the secondary grouping and/or proposing a modification to the secondary grouping, in accordance with some example embodiments.

The resource(s) that a secondary resource reuse group uses from the other primary resource reuse group may, as noted, be referred as its secondary band. The secondary band may be used with or without coordination over time and frequency for cell edge users. A cell may also use another cell's primary resources without co-ordination provided that the cells are not in same primary resource reuse group. In the single mobile network operator case, cells may be non-overlapping and, as such, the spectrum to be used without coordination may not be shared by any other overlapping cell. A cluster of small cells from one mobile network operator may also request the formation of secondary resource reuse group with another cluster of another mobile network operator. If the two mobile network operators are far enough from each other and thus non-overlapping, the shared resources may be available to be used without coordination.

In some example embodiments, a secondary band of resources may have a lower usage priority, so that a primary band of resources is utilized first. Moreover, a secondary band for one cell may be a primary band for another cell. When this is the case, the cell for which the band is primary may have a higher access priority. A cell may have a primary resource reuse group but may not have a secondary resource reuse group. If available, interference between the resource groups may be checked via test signals, map information, and/or a non-permeable wall between neighboring cells.

Figure 3:
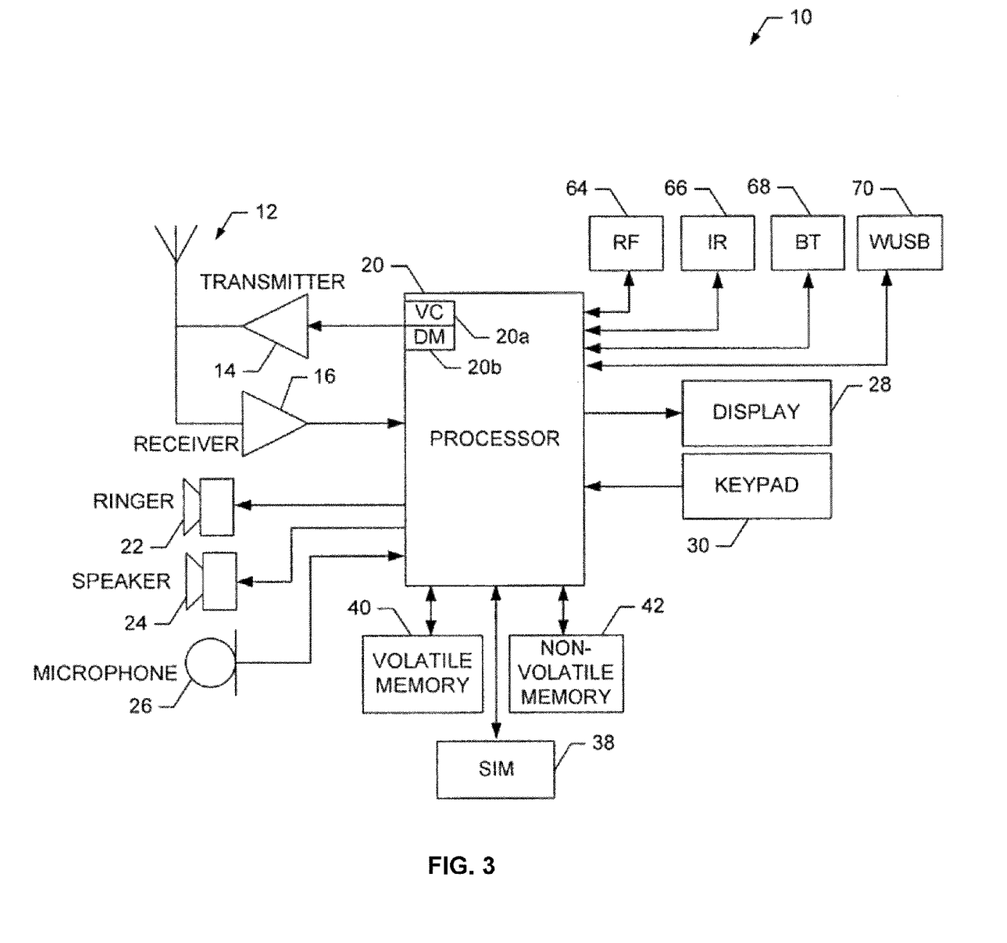
FIG. 3 depicts an apparatus, in accordance with some example embodiments.

FIG. 3 illustrates a block diagram of an apparatus 10, in accordance with some example embodiments. The apparatus 10 (or portions thereof) may be configured to provide a user equipment, a smartphone, a cellular phone, a wireless sensor/ device, a base station, a wireless access point, and/or any other type of radio-based device.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like.

Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 200, 299, and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 200, 299, and/or the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is optimized use of network resources in small cell deployments.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method comprising:
receiving, at a resource control node, information including location information for at least one cell of a primary resource group and another cell of another primary resource group, wherein the received information further includes a primary resource being used by the at least one cell and another primary resource being used by the other cell; and determining, by the resource control node, at least one secondary resource group including the at least one cell and the other cell, wherein the at least one secondary group is determined based on the received information and a determination of an overlapping coverage area between the at least one cell and the other cell, wherein the at least one cell and the other cell are enabled to share, as part of the determined at least one secondary resource group, the primary resource.

2. The method of claim 1, wherein the at least one cell and the other cell share, as a secondary resource, the primary resource.

3. The method of claim 1, wherein the primary resource comprises at least one of a frequency or a time.

4. The method of claim 1, wherein the primary resource group and the other primary resource group have a non-overlapping coverage area.

5. The method of claim 1, wherein the at least one cell of the primary resource group is in a first mobile network, and the other cell of the other primary resource group is in a second mobile network.

6. The method of claim 5, wherein the first mobile network signals the second mobile network to form the at least one secondary resource group by at least requesting the information including the location information and the primary resource.

7. The method of claim 6, wherein the first mobile network is operated by a network operator different than the second mobile network.

8. The method of claim 1, wherein the at least one cell and/or the other cell each comprise a small cell.

9. An apparatus, comprising:
at least one processor; and
at least one memory including computer program code, the at least one memory and the computer program code configured to, with the at least one processor, cause the apparatus to perform at least the following:

receive, at the apparatus, information including location information for at least one cell of a primary resource group and another cell of another primary resource group, wherein the received information, further includes a primary resource being used by the at least one cell and another primary resource being used by the other cell; and determine, by the apparatus, at least one secondary resource group including the at least one cell and the other cell, wherein the at least one secondary group is determined based on the received information and a determination of an overlapping coverage area between the at least one cell and the other cell, wherein the at least one cell and the other cell are enabled to share, as part of the determined at least one secondary resource group, the primary resource.

10. The apparatus of claim 9, wherein the at least one cell and the other cell share, as a secondary resource, the primary resource.

11. The apparatus of claim 9, wherein the primary resource comprises at least one of a frequency or a time.

12. The apparatus of claim 9, wherein the primary resource group and the other primary resource group have a non-overlapping coverage area.

13. The apparatus of claim 9, wherein the at least one cell of the primary resource group is in a first mobile network, and the other cell of the other primary resource group is in a second mobile network.

14. The apparatus of claim 13, wherein the first mobile network signals the second mobile network to form the at least one secondary resource group by at least requesting the information including the location information and the primary resource.

15. The apparatus of claim 9, wherein the apparatus comprises a resource control node.

* * * * *